US007571791B2

(12) United States Patent
Finn et al.

(10) Patent No.: US 7,571,791 B2
(45) Date of Patent: Aug. 11, 2009

(54) DEVICE AND METHOD FOR SELF-ALIGNING POSITION REFERENCE SYSTEM

(75) Inventors: Alan M. Finn, Hebron, CT (US); Jae-Hyuk Oh, Tolland, CT (US); Pei-Yuan Peng, Ellington, CT (US)

(73) Assignee: Otis Elevator Company, Farmington, CT (US)

( * ) Notice: Subject to any disclaimer, the term of this patent is extended or adjusted under 35 U.S.C. 154(b) by 580 days.

(21) Appl. No.: 10/580,149

(22) PCT Filed: Nov. 26, 2003

(86) PCT No.: PCT/US03/38181

§ 371 (c)(1), (2), (4) Date: May 18, 2006

(87) PCT Pub. No.: WO2005/062734

PCT Pub. Date: Jul. 14, 2005

(65) Prior Publication Data

US 2007/0095617 A1 May 3, 2007

(51) Int. Cl.
*B66B 3/02* (2006.01)
*G01B 11/14* (2006.01)

(52) U.S. Cl. ....................................... 187/394; 187/393

(58) Field of Classification Search ......... 187/391-394, 187/247, 248

See application file for complete search history.

(56) References Cited

U.S. PATENT DOCUMENTS

| | | | | | |
|---|---|---|---|---|---|
| 3,963,098 | A | * | 6/1976 | Lewis et al. | 187/394 |
| 5,135,081 | A | * | 8/1992 | Watt et al. | 187/394 |
| 5,509,505 | A | * | 4/1996 | Steger et al. | 187/394 |
| 5,783,784 | A | | 7/1998 | Durand | |
| 5,821,477 | A | * | 10/1998 | Gerstenkorn | 187/394 |
| 6,435,315 | B1 | | 8/2002 | Zaharia | |
| 6,612,403 | B2 | | 9/2003 | Silberhorn et al. | |
| 6,874,244 | B2 | * | 4/2005 | Birrer et al. | 187/294 |
| 6,886,667 | B2 | * | 5/2005 | Kunz et al. | 187/394 |
| 2001/0022899 | A1 | * | 9/2001 | Castelli et al. | 399/9 |
| 2007/0084675 | A1 | * | 4/2007 | Kang et al. | 187/394 |
| 2008/0193138 | A1 | * | 8/2008 | Oh et al. | 398/128 |

* cited by examiner

*Primary Examiner*—Walter Benson
*Assistant Examiner*—Eduardo Colon-Santana
(74) *Attorney, Agent, or Firm*—Bachman & LaPointe, P.C.

(57) ABSTRACT

A positioning system for a moveable platform comprising at least one active array comprised of at least one light emitting element for transmitting a binary encoded identification, where the encoding may be spatial or temporal, positioned at a known location, at least one camera for acquiring an image of the at least one active array, component for receiving the binary encoded identification from the image, component for processing the image to determine the position of the active array with respect to the moveable platform, and component for combining the received binary encoded identification and the determined position to calculate a position of the moveable platform.

10 Claims, 1 Drawing Sheet

DEVICE AND METHOD FOR SELF-ALIGNING POSITION REFERENCE SYSTEM

BACKGROUND OF THE INVENTION (1) Field of the Invention

The present invention relates to a system, and a method for using such a system, comprising active position transmitters to determine the position of a moveable platform. More specifically, the present invention relates to a method of using active transmitters to determine the position of an elevator in a hoistway.

(2) Description of Related Art

A Positioning Reference System (PRS) is component of an elevator control system that provides fast and accurate position measurement of a moveable platform, in particular an elevator car, in a hoistway. Two problems associated with optical position reference systems, especially those for elevator Positioning Reference Systems, arise as the result of ambient light interference, especially in a glass hoistway, and reduced performance under emergency conditions due to fire or smoke. These deficiencies are fundamental when using optical detection of a passive reflector containing coded information.

What is therefore needed is a high-accuracy positioning means with low cost for installation, and maintenance.

SUMMARY OF THE INVENTION

Accordingly, it is an object of the present invention to provide a system, and a method for using such a system, comprising active position transmitters to determine the position of a moveable platform. More specifically, the present invention relates to a method of using active transmitters to determine the position of an elevator in a hoistway.

In accordance with the present invention, a positioning system for a moveable platform comprises at least one active array comprised of at least one light emitting element for transmitting a binary encoded identification, where the encoding may be spatial or temporal, positioned at a known location, at least one camera for acquiring an image of the at least one active array, means for receiving the binary encoded identification from the image, means for processing the image to determine the position of the active array with respect to the moveable platform, and means for combining the received binary encoded identification and the determined position to calculate a position of the moveable platform.

In accordance with the present invention, a method for determining a position of a moveable platform comprises the steps of providing a plurality of active arrays at fixed positions each active array comprising at least one light emitting element for transmitting a binary encoded identification, where the encoding may be spatial or temporal, affixing at least one camera to a moveable platform, imaging at least one of the plurality of active arrays with the at least one camera to produce an image, performing image processing on the image to receive the binary coded identification and to determine a position with respect to the moveable platform, and combining the binary coded identification with the position of the active array to determine a location of the moveable platform.

DETAILED DESCRIPTION OF THE PREFERRED EMBODIMENT(S)

it is a teaching of the present invention to provide an optical position reference system (PRS) incorporating a series of active optical transmitters, or arrays of optical transmitters, located along a hoistway, in place of the commonly used passive reflectors. The active optical transmitters convey both spatial and temporal information from which may be computed the location of an elevator. As is described more fully below, the basic position computation is accomplished through image processing, and, in one embodiment, by well-known triangulation methods. In practice, the present invention preferably incorporates the use of more than one camera attached to the elevator to provide for increased accuracy and fault tolerance.

Figure 1:
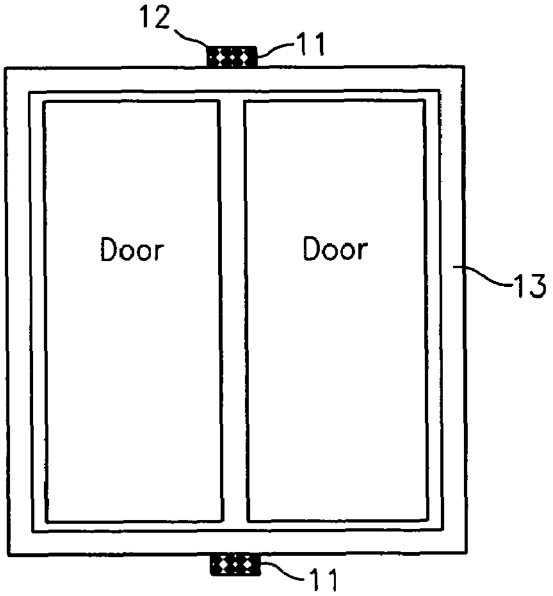
FIG. 1 A diagram of the placement of the active arrays of the present invention.

With reference to FIG. 1, there is illustrated the preferred placement of the active arrays 11 of the present invention. Each active array 11 may be either a one-dimensional or two dimensional array of light emitting elements 12. Each light emitting element is preferably a Light Emitting Diode (LED), or, alternatively any IR, visible, or UV frequency light emitter. At least one, preferably two, active arrays are affixed at known position upon the doorframe 13 of a hoistway 14. In an alternative embodiment, active array 11 may consist of a single light emitting element 12.

Figure 2:
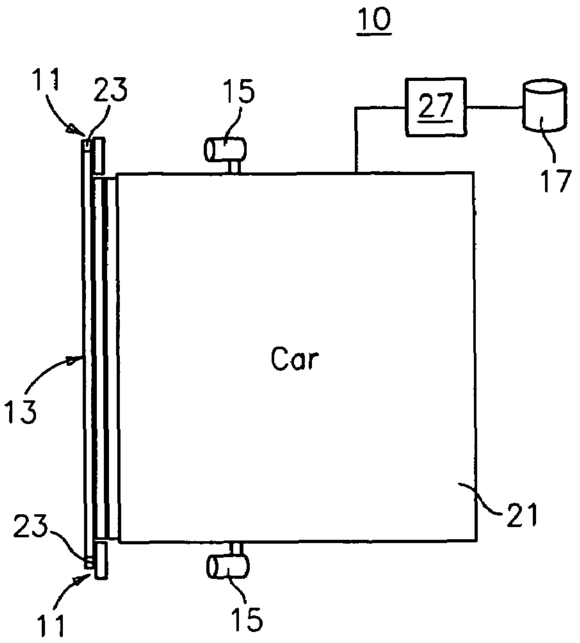
FIG. 2 A diagram of the Position Reference System (PRS) of the present invention.

With reference to FIG. 2, there is illustrated the PRS 10 of the present invention. In addition to the active arrays 11 affixed to the doorframe 13, there is at least one, preferably two, cameras 15 affixed to the moveable platform 21. In a preferred embodiment, moveable platform 21 is an elevator car. The active arrays 11 are situated at known positions on the doorframes 13 at each floor. When activated, the light emitting element 12 of each active array 11 are activated in a predefined pattern. Each light emitting element 12 may be turned on or off. In the instance where the active arrays 11 are one or two dimensional arrays, the light emitting elements 12 of each active array 11 are turned on in a pattern unique to a particular active array 11. In this manner, each active array 11 displays a binary coded identification of the active array 11. In the instance that each active array 11 is comprised of a single light emitting element 12, the single light emitting element flashes on and off in a predetermined sequence which can be temporally interpreted as a binary coded identification of the active array 11.

The unique code associated with each active array 11 as well as the position of each active 11 is stored in a database 17 and is accessible by the PRS 10. In one embodiment, redundancy is added to the PRS 10 by overloading the binary coded identification of each active array 11. As used herein, "overloading" refers to the practice of mapping more than one binary identification code to a single active array 11. Where such overloading occurs, each of the more than one binary identification codes may be flashed in rapid succession. In the event that a single light emitting element 12 is disabled, it may prove possible to deduce the identity of the active array 11 from the multitude of binary identification codes. In an alternative embodiment, the binary identification codes of each active array 11 may be dynamically configured. In yet another alternative embodiment, the unique code may include a spatial or temporal error correcting code (ECC) portion.

In order to receive the binary identification codes, the PRS 10 images the active arrays 11 as the moveable platform moves up and down the hoistway. The use of active transmitters, such as the light emitting elements 12, to visually transmit location information allows for the transmission of both spatial and temporal information to the cameras 15, instead of just spatial information as with passive reflectors. The light emitting elements 12 of the present invention possess approximately 4 times higher visibility in smoke than does a passive reflector for the same illumination intensity. In addition, the light emitting elements are able to increase the signal to noise ratio at the cameras 15 by dynamically varying the intensity of their emitted light in response to changes in the hoistway environment. Each active array 11 is powered by a power supply 23. In a preferred embodiment the power supplies 23 are comprised of wiring already in the hoistway. Alternatively, a battery or wireless power coupling may power the active arrays.

Figure 3:
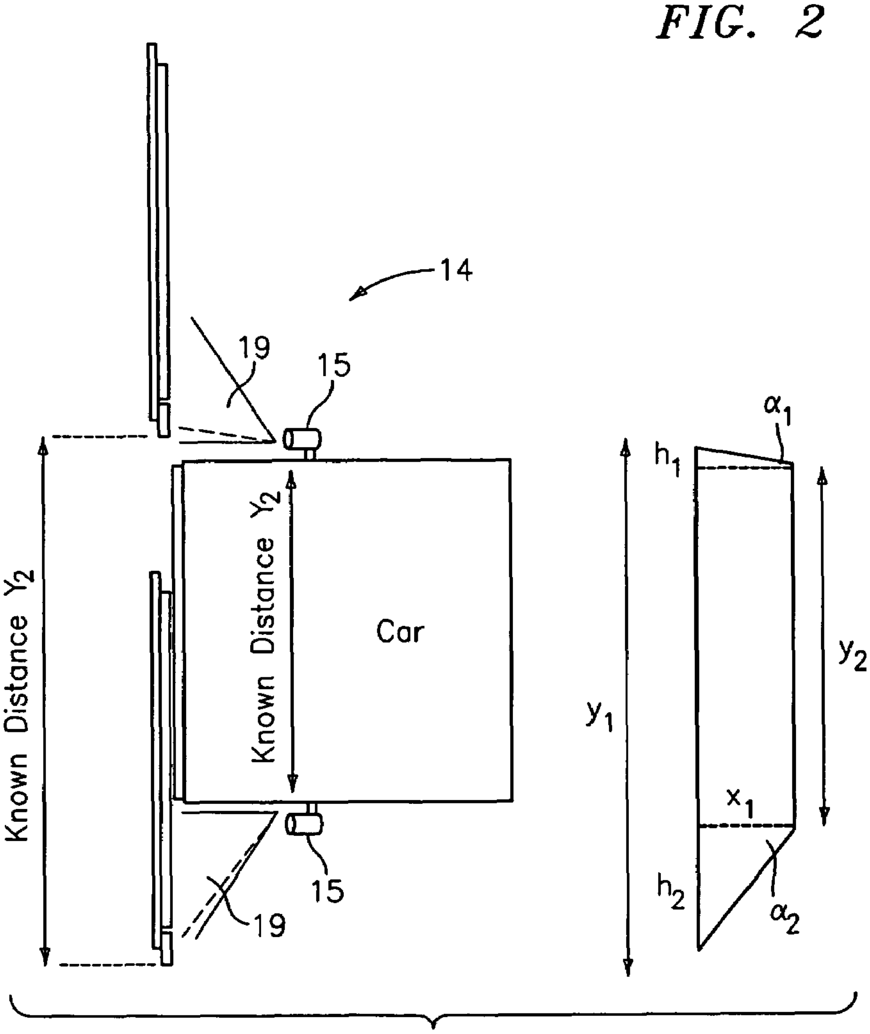
FIG. 3 A diagram of the method by which the PRS of the present invention is utilized to determine the position of the moveable platform.

In one embodiment, additional fault-tolerance and position accuracy may be obtained by using a plurality of cameras 15 and well known triangulation techniques, as illustrated with reference to FIG. 3. Active arrays 11 are placed at the top and bottom of a door frame 13, in locations to allow triangulation an a single doorframe. This configuration is particularly advantageous for doorframes at the top or bottom of an express zone. When the moveable platform 21 is positioned such that two active arrays 11 are each within the field of view 19 of one of the two cameras 15, the active arrays can be imaged by the cameras. The images so captured undergo image processing by electronic computational device, such as a microprocessor, to determine the binary identification code of the active arrays 11, and to discern the absolute position of the light elements 12 in each image with relationship to the known positions of each camera 15. The actual positions of the active arrays 11, and hence, the light emitting elements 12, are retrieved from database 17 and utilized to determine the position of the elevator as described below.

Provided that the distance $Y_1$, the distance between each pair of active arrays 11, is known and stored in database 17 the vertical offsets of the top and bottom of the moveable platform from each active array may be computed as:

$$h_2 = \frac{y_1 - y_2}{\frac{\tan(\alpha_1)}{\tan(\alpha_2)} + 1} \quad h_1 = \frac{y_1 - y_2}{\frac{\tan(\alpha_2)}{\tan(\alpha_1)} + 1}$$

The known lengths $y_1$ and $y_2$ may change slowly over time and can be updated.

In operation, therefore, as the moveable platform 21 moves up and down the hoistway 14, a camera 15 or cameras 15 receive coded binary information sent from the active arrays 11. At least one camera must have in view at least one active array 11 at all times to determine absolute position. Imaging processing is performed by a computational device 27 on the image or images so captured to determine the offset of the cameras, and hence the moveable platform 21, from the active array/s 11. By retrieving the absolute position of each imaged active array 11 from the database 17, the absolute position of the moveable platform may be computed.

As described above, the PRS of the present invention allows for fault-tolerance by permitting the dynamic reconfiguration of the array for failed light emitting elements 21. In addition the PRS of the present invention permits the determination of an absolute position reference using a single visual reference over a period of time as when an active array 11 comprises a single light emitting element 12.

It is apparent that there has been provided in accordance with the present invention a system, and a method for using such a system, comprising active position transmitters to determine the position of a moveable platform which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A positioning system for a moveable platform comprising:

at least one active array attached to at least one fixed non-movable structure in a hoistway, each said active array comprised of at least one light emitting element for transmitting a binary encoded identification positioned at a known location;

at least one camera for acquiring an image of said at least one active array;

means for receiving said binary encoded identification from said image;

means for processing said image to determine the position of said active array with respect to said moveable platform; and means for combining said received binary encoded identification and said determined position to calculate a position of said moveable platform.

2. The apparatus of claim 1 wherein said at least one camera is affixed to said moveable platform and said at least one active array is affixed to a doorframe.

3. The apparatus of claim 2 wherein said moveable platform is an elevator.

4. The apparatus of claim 1 wherein said at least one light emitting element is selected from the group consisting of a Light Emitting Diode (LED), an IR emitter, a visible light emitter, and a UV frequency light emitter.

5. The apparatus of claim 1 additionally comprising a database in which is stored position information of each of said at least one active array.

6. A method for determining a position of a moveable platform comprising the steps of:

providing a plurality of active arrays attached to at least one fixed non-movable structure in a hoistway at fixed positions, each active array comprising at least one light emitting element for transmitting a binary encoded identification;

affixing at least one camera to a moveable platform;

imaging at least one of said plurality of active arrays with said at least one camera to produce an image;

performing image processing on said image to receive said binary coded identification and to determine a position with respect to said moveable platform; and combining said binary coded identification with said coded information with said position of said active array to determine a location of said moveable platform.

7. The method of claim 6 wherein said step of providing said plurality of active arrays comprises selecting said at least one light emitting element form the group consisting of a Light Emitting Diode (LED), an IR light emitter, a visible light emitter, and a UV frequency light emitter.

8. The method of claim 6 comprising the additional step of retrieving a position of said active array from a database using said binary encoded identification.

9. The method of claim 6 wherein said affixing said at least one camera to a moveable platform comprises affixing said at least one camera to an elevator.

10. The method of claim 6 comprising the additional step of dynamically configuring at least one of said active arrays.

* * * * *

UNITED STATES PATENT AND TRADEMARK OFFICE

CERTIFICATE OF CORRECTION

PATENT NO. : 7,571,791 B2
APPLICATION NO. : 10/580149
DATED : August 11, 2009
INVENTOR(S) : Alan Finn et al.

It is certified that error appears in the above-identified patent and that said Letters Patent is hereby corrected as shown below:

In column 4, line 3, after "IR" and before "emitter" --light-- should be inserted.

In column 4, line 3, the word "form" should be deleted and the word --from-- should be inserted.

Signed and Sealed this

Twenty-seventh Day of October, 2009

David J. Kappos

*Director of the United States Patent and Trademark Office*

UNITED STATES PATENT AND TRADEMARK OFFICE

CERTIFICATE OF CORRECTION

PATENT NO. : 7,571,791 B2
APPLICATION NO. : 10/580149
DATED : August 11, 2009
INVENTOR(S) : Finn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

Seventh Day of September, 2010

David J. Kappos

*Director of the United States Patent and Trademark Office*